US006453383B1

(12) United States Patent
Stoddard et al.

(10) Patent No.: US 6,453,383 B1
(45) Date of Patent: Sep. 17, 2002

(54) MANIPULATION OF COMPUTER VOLUME SEGMENTS

(75) Inventors: Theron M. Stoddard, Highland, UT (US); Blaine S. Dennis, Alpine, UT (US); Robert S. Raymond, Orem, UT (US)

(73) Assignee: PowerQuest Corporation, Orem, UT (US)

( * ) Notice: Subject to any disclaimer, the term of this patent is extended or adjusted under 35 U.S.C. 154(b) by 0 days.

(21) Appl. No.: 09/374,556

(22) Filed: Aug. 13, 1999

Related U.S. Application Data

(60) Provisional application No. 60/124,401, filed on Mar. 15, 1999, and provisional application No. 60/133,335, filed on May 10, 1999.

(51) Int. Cl.[7] .............................................. G06F 12/02
(52) U.S. Cl. ........................ 711/112; 707/205; 711/162; 711/170; 711/173; 273/1; 273/2; 273/100
(58) Field of Search ........................ 711/111–114, 104, 711/161, 162, 165, 170–173; 707/205; 713/1, 2, 100

(56) References Cited

U.S. PATENT DOCUMENTS

| | | |
|---|---|---|
| 5,675,769 A | 10/1997 | Ruff et al. ................... 711/173 |
| 5,706,472 A | 1/1998 | Ruff et al. ................... 711/173 |
| 5,907,672 A | 5/1999 | Matze et al. ................... 714/8 |
| 5,930,831 A | 7/1999 | Marsh et al. ............... 711/173 |
| 5,956,745 A * | 9/1999 | Bradford et al. ............ 711/137 |
| 6,185,575 B1 * | 2/2001 | Orcutt ......................... 707/200 |
| 6,185,666 B1 | 2/2001 | Murray et al. .............. 711/173 |

OTHER PUBLICATIONS

PCT/US99/18448 Written Opinion, Feb. 22, 2001.
Response to Written Opinion, Feb. 28, 2001.
RESIZE.NLM, no later than Feb. 20, 1998.
File Services, no later than Mar. 6, 1999.
"Adding Vol. Segment in NetWare", Sep. 22, 1998.
Bierer et al., *NetWare 4 for Professionals*, Ch. 23, 1993.
Custer, *Inside the Windows NT File System*, 1994.

* cited by examiner

*Primary Examiner*—Do Hyun Yoo
(74) *Attorney, Agent, or Firm*—Computer Law++

(57) ABSTRACT

Methods and systems are provided for manipulating data in segmented environments such as an instance of a NetWare file system. Unlike the conventional approach that relies on FDISK and the install.nlm and nwconfig.nlm utilities in NetWare, the invention does not destroy user data on the disk after the data is copied to tape or other intermediate storage. Segment-related features such as limits on the number of segments; various configurations of segments, volumes and partitions among drives; and data mirroring, are handled by the invention during "in place" manipulations. Segments, volumes, partitions, and segment clusters or blocks may each be resized. Segments may be merged. Volumes may be consolidated on a single drive. Other manipulations and various combinations of manipulations are also provided.

39 Claims, 6 Drawing Sheets

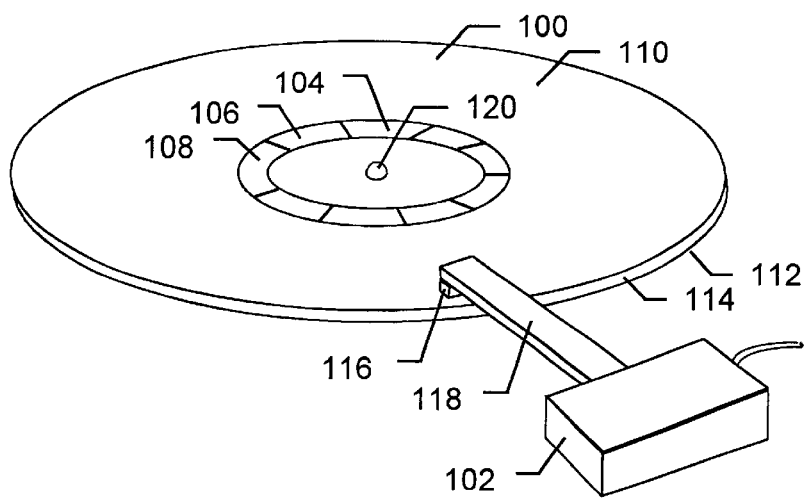
Fig. 1
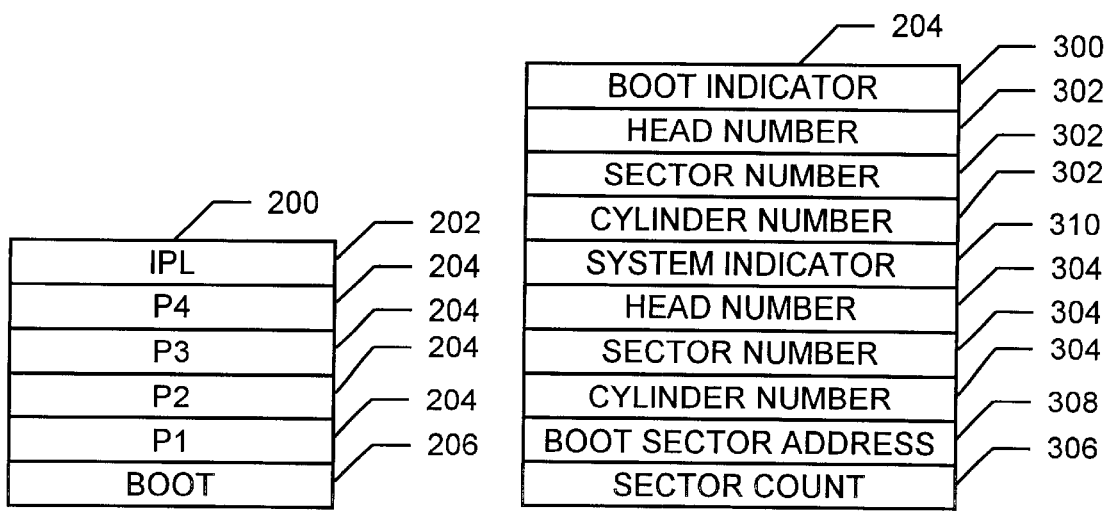
Fig. 2
Fig. 3

MANIPULATION OF COMPUTER VOLUME SEGMENTS

RELATED APPLICATIONS

The present application relates to and incorporates by reference commonly owned copending applications Ser. No. 60/124,401 filed Mar. 15, 1999 and Ser. No. 60/133,335 filed May 10, 1999.

FIELD OF THE INVENTION

The present invention relates to manipulation of computer volume segments without archiving or destroying user data, and more particularly to tools and techniques for resizing, moving, merging, consolidating, scattering, and/or mirroring volume segments such as volume segments found in segmented partition computer systems.

TECHNICAL BACKGROUND OF THE INVENTION

Computers utilize a wide variety of disks as storage media for user data. Disk technologies currently provide optical disks, magnetic disks, hard disks, floppy disks, and removable disks, and new disk technologies are being actively researched and developed. Indeed, some disks used by computers in the future may be cubical or some other shape rather than flat and circular. Investigation into non-volatile semiconductor storage devices is ongoing.

FIG. 1 illustrates a disk 100 attached to a disk drive 102. The disk 100 illustrates physical characteristics of both floppies and hard disks; cubical disks or other disks may appear in different configurations than the one shown here. The disk 100 contains a number of concentric data cylinders such as the cylinder 104. The cylinder 104 contains several data sectors, including sectors 106 and 108. The sectors 106 and 108 are located on an upper side 110 of the disk 100; additional sectors may be located on a lower side 112 of the disk 100. The sides 110, 112 of the disk 100 define a platter 114. A hard disk may contain several platters. The upper side 110 of the disk 100 is accessed by a head 116 mounted on an arm 118 secured to the drive 102. Optical or cubical disks may be accessed by other means, such as photoemitters or photoreceptors.

A given sector on the disk 100 may be identified by specifying a head, a cylinder, and a sector within the cylinder. A triplet specifying the head number, cylinder number, and sector number in this manner is known as a "physical sector address." Alternatively, a given sector may be identified by a logical sector address, which is a single number rather than a triplet of numbers.

An operating system manages access, not only to the disk 100, but to other computer resources as well. Resources typically managed by the operating system include one or more disks and disk drives, memory (RAM and/or ROM), microprocessors, and I/O devices such as a keyboard, mouse, screen, printer, tape drive, modem, serial port, parallel port, or network port.

Many disks mold the available space into one or more partitions by using a partition table located on the disk. A wide variety of partitions are used, and more partition types will no doubt be defined over time. A partial list of current partitions and their associated file systems is given in U.S. Pat. No. 5,930,831 and incorporated here by reference. The list includes a variety of 12-bit, 16-bit, and 32-bit FAT file systems and numerous other file systems. Tools and techniques for manipulating FAT and certain other partitions are described in U.S. Pat. Nos. 5,675,769, 5,706,472, and 5,930,831 assigned to PowerQuest Corporation, incorporated herein by this reference.

Some file systems provide useful features not available under many existing FAT file systems. Examples include the NT File System ("NTFS") and the Novell NetWare file system ("NetWare FS") (NetWare is a mark of Novell, Inc.). Discussions of NTFS are provided in "Inside the Windows NT File System", by Helen Custer, ISBN 1-55615-660-X, as well as in marketing and technical materials available in hard copy and on the Internet from Microsoft Corporation and other sources. Discussions of NetWare FS are provided in Chapter 23 of "NetWare 4For Professionals", by Bierer et al., ISBN 1-56205-217-9, as well as in marketing and technical materials available in hard copy and on the Internet from Novell, Inc. and other sources. Some of the comments herein apply only to certain versions of NetWare, such as those prior to version 5. Those of skill in the art will note that these discussions sometimes involve unimplemented specifications or mere speculations, particularly in the case of NTFS. NTFS features include, without limitation: use of a database paradigm to support indexing of file attributes; multiple data streams per file; blurring of the distinction between system and user areas; recoverability by use of a log; recoverability by use of transactions; support for large disks; security descriptors constraining access to file objects; Unicode names; support for POSIX features such as links; bad cluster remapping; caching support; virtual memory support; system structure compression; balanced tree directory structures; support for suballocation whereby a cluster may hold data belonging to one or more files; support for volume spanning, volume sets, stripe sets, mirror sets, and other features which divide a file system's contents between disks or partitions; and a relocatable system area.

One partition table composition, denoted herein as the "IBM-compatible" partition table, is found on the disks used in many IBM® personal computers and IBM-compatible computers (IBM is a registered trademark of International Business Machines Corporation). Although IBM is not the only present source of personal computers, server computers, and computer operating systems and/or file system software, the term "IBM-compatible" is widely used in the industry to distinguish certain computer systems from other computer systems such as Macintosh computer systems produced by Apple Computer (Macintosh is a market of Apple Computer). IBM-compatible partition tables may be used on a wide variety of disks, with a variety of partition and file system types, in a variety of ways.

As shown in FIG. 2, one version of an IBM-compatible partition table 200 includes an Initial Program Loader ("IPL") identifier 202, four primary partition identifiers 204, and a boot identifier 206. As shown in FIG. 3, each partition identifier 204 includes a boot indicator 300 to indicate whether the partition in question is bootable. At most one of the partitions in the set of partitions defined by the partition table 200 is bootable at any given time.

Each partition identifier 204 also includes a starting address 302, which is the physical sector address of the first sector in the partition in question, and an ending address 304, which is the physical sector address of the last sector in the partition. A sector count 306 holds the total number of disk sectors in the partition. A boot sector address 308 holds the logical sector address corresponding to the physical starting address 302.

Some IBM-compatible computer systems allow "logical partitions" as well as the primary partitions just described.

All logical partitions are contained within one primary partition; a primary partition which contains logical partitions is also known as an "extended partition."

Each partition identifier 204 also includes a system indicator 310. The system indicator 310 identifies the type of file system contained in the partition, which in turn defines the physical arrangement of data that is stored in the partition on the disk 100 (FIG. 1). Values not recognized by a particular operating system are treated as designating an unknown file system. The file system associated with a specific partition of the disk 100 (FIG. 1) determines the format in which data is stored in the partition, namely, the physical arrangement of user data and of file system structures in the portion of the disk 100 that is delimited by the starting address 302 and the ending address 304 of the partition in question. At any given time, each partition thus contains at most one type of file system.

Some computer systems, such as many using NetWare FS or NTFS, mold disk storage into "segmented partitions" or "segmented volumes" with an approach somewhat different from that described above. On such systems, a "volume" is an instance of a file system. Hard drives may be divided into partitions, and volumes may be divided into "segments". A "segmented volume" is a volume which does or can contain segments, i.e., a segmentable volume. A "segmented partition" is a partition which does or can contain segments, i.e., a segmentable partition. For instance, a type 06 partition is not a segmented partition. A given partition may hold zero or more segments from zero or more volumes which are instances of one or more file systems; the cases of primary interest here are those in which one or more segments from one or more volumes are present.

The file system structures on disk do not necessarily reflect the presence of segments. Some NetWare FS structures can define the location and/or extent of segments, for example, but structures manipulated by NTFS routines do not ordinarily define segment extent or location. Segments may be created with conventional tools in order to improve response times or to provide fault tolerance. For example, in a Microsoft Windows NT environment, the Disk Administrator tool can be used to set up an NTFS volume that spans multiple disk drives. As another example, FIG. 4 illustrates a configuration in which two drives 400, 402 are molded. Drive 400 includes a DOS partition 404 and a first NetWare partition 408, while drive 402 includes an NTFS partition 406 and a second NetWare partition 410. A NetWare partition is a section of a disk 100 which is allocated to NetWare by a partition table; the partitions 404, 406, 408, and 410 are defined using a partition table such as the table shown in FIG. 2. NetWare partitions may not span disks. Segmented partitions in other environments may be subject to the same or similar requirements. Although specific definitions of "disk" and "drive" are given above, those of skill in the art will recognize that these terms are sometimes used interchangeably when the distinction between the media and the controller/drive mechanism is not important.

The first NetWare partition 408 includes two volume segments 412 and 414, and the second NetWare partition 410 includes volume segments 416 and 418. The volume segments 412 and 416 belong to SYS volume 420, while the volume segments 414, 418 belong to a VOL1 volume 422. More generally, a NetWare segment is a section of a NetWare volume, and a NetWare volume is a section of one or more NetWare partitions which is formatted for a file system such as NetWare FS. NetWare partitions can include segments from more than one NetWare volume, but a given NetWare partition can hold at most 8 segments. NetWare volumes can include several NetWare segments on multiple disk drives, and each volume may hold up to 32 segments. Segments and volumes in other environments may be subject to the same or similar requirements.

Those of skill in the art will recognize that FIG. 4 illustrates only one of the many possible configurations. For instance, all segments belonging to a given volume can be stored on the same drive. Likewise, a given segmented partition may hold several segments from a given volume. In addition, a given system will not necessarily contain an NTFS partition, and/or might contain several DOS, FAT16, FAT32, HPFS, NTFS, or other partitions. NetWare FS is a widely used example of a file system whose instances are segmented volumes, but other file systems may also be instantiated with volumes, segments, and partitions in an analogous manner and therefore be suitable for beneficial manipulation according to the present invention. Finally, segmented volumes are used most commonly on computer network servers, but may also be used on client or standalone machines.

It is sometimes desirable to alter the configuration of a computer system which is using NetWare FS or another segmented partition environment. However, even sophisticated approaches to partition manipulation, such as those described in U.S. Pat. Nos. 5,675,769, 5,706,472, and 5,930,831, or in the non-provisional pending applications identified herein, do not fully address either the complexities or the opportunities presented by volume segments. Less advanced approaches are even less helpful.

One conventional approach begins by copying all necessary user and system data off the disk to a temporary storage location such as a tape or additional disk(s). The data copied includes without limitation the contents of files created by the user such as textual documents and spreadsheets, the contents of files required to run applications such as word processors, and system data such as directory information. Some internal file system data such as sector allocation maps may not need to be copied, but is often copied anyway. Familiar disk utilities such as FDISK, the install.nlm and nwconfig.nlm utilities in NetWare that manipulate partitions and volumes, and formatting utilities are then used to update the disks (thereby destroying some or all of the user data on the disk). Finally, the data is copied back into the newly configured disks. During this copying process the file system copy or restore utility creates appropriate new file system structures reflecting the current locations of data on the disk.

This approach to volume segment and partition manipulation has several drawbacks. A temporary storage device with adequate storage capacity may not be readily available or affordable under the circumstances. Even if temporary storage is available, copying large amounts of data from the disk to temporary storage and then back again can take a substantial period of time. In addition, manipulating disks in this manner is confusing and dangerous for many computer users. Users who are unfamiliar with the numerous technical details required as input to the conventional utilities may easily and inadvertently destroy data and/or make it necessary to further modify the disks with FDISK or the install or nwconfig NLMs again, to reformat again, and to once again copy all the data from temporary storage into the reformatted partition. Even if everything works as desired the first time, this approach to partition and/or volume segment modification can be very time-consuming. With a typical disk holding several gigabytes of data the process may require several hours to complete successfully.

Manipulation of volume segments is further complicated when disk contents are subject to disk mirroring or disk duplexing. Disk mirroring and disk duplexing are collectively referred to herein as "data duplicating". Under disk mirroring, two hard disks are accessed through a single disk channel. Each time data is sent to the first disk, the same data is subsequently sent to the second disk through the shared channel so that the data will be preserved even if the first disk crashes. Under disk duplexing, two copies of data are sent at the same time through two disk channels to two hard disks. Once again, the goal is to protect the data against loss. With either form of data duplication, volume segment manipulation is complicated by the need to perform the manipulation(s) without substantially increasing the risk of data loss by unsuitable interference with the data duplication process.

Thus, it would be an advancement in the art to provide improved tools and techniques for manipulating volume segments and their attendant partitions.

It would also be an advancement to provide such improved tools and techniques which operate safely and efficiently in the presence of data duplicating.

Such improved tools and techniques are disclosed and claimed herein.

BRIEF SUMMARY OF THE INVENTION

The present invention provides tools and techniques for manipulating volume segments. Possible manipulations include resizing a volume segment, moving a volume segment within a given partition or between partitions, merging two volume segments to create a single volume segment containing the data previously found in the two segments, and variations on these manipulations such as consolidating the segments of a given volume on the smallest possible number of drives or on a given set of drives, scattering the segments of a given volume among several drives, and manipulating mirrored volume segments. The invention also provides tools and techniques for safely and efficiently manipulating a partition that contains volume segments, including the manipulation of volume segments when a NetWare FS or other segmented partition is resized by moving the partition's left boundary (the boundary closest to the file allocation table).

One embodiment resizes a single segment of a segmented volume by moving the left or right segment boundary and making appropriate adjustments to system tables. This may require relocating the system tables as necessary to make them be correctly located in the segment, that is, to place them where the file system or other system software expects to find them. A segment can be reduced to a minimum size to reduce the amount of space used by the segment. A segment can also be enlarged to a maximum size to include available free space which is adjacent to the segment. The amount of free and used space in other segments of the same volume is not necessarily changed.

Volume segments are reduced by relocating all used blocks as necessary into an area of the segment which is the desired reduced size, and then adjusting file system or other system tables to reflect the new size. Volume segments are enlarged by increasing file allocation tables to reference newly added space and by adjusting system tables to reflect the new size. The NetWare partition "redirection area", also known as the "hot fix" area, is resized down to the default size when resizing the partition to make the partition smaller.

One embodiment moves a volume segment to free space within a NetWare or other segmented partition. The free space may be adjacent to the segment which is being moved, or the free space may be within the same segmented partition but not adjacent because other volume segments are located between the segment which is being moved and the free space. The free space may also be on a segmented partition on another disk. The user selects a volume segment and selects the free space to which the volume segment will be moved. Only free space that is within a segmented partition, or free space that is not in any partition and that is large enough to accommodate the segment being moved, can be selected. After the volume segment is successfully copied to its new location, the original copy of the segment is deleted. System tables within both the source and destination partitions, such as volume definition tables, are updated to reflect the change.

Sectors that go bad in a NetWare partition are marked and the data that would have been stored in the bad sector is moved to a safe sector in the NetWare redirection area. Bad sectors are similarly avoided in other segmented partitions by using a bad sector file, a bad sector list, or a similar mechanism. During the read portion of a move, the bad sector table is checked, the bad sectors are ignored, and the good sectors and the redirected sectors are moved directly to the new partition, so fewer unnecessary reads of bad sectors are performed. The destination partition may also have bad sectors to avoid by redirecting data. The invention checks the destination's bad sector table, so that data is written directly to the redirection area instead of onto the bad sectors in the destination partition.

One embodiment combines two NetWare or other segments. The segments must be from the same volume and they must be adjacent to each other in the same segmented partition. They must also be sequential, e.g., volume segment 0 next to volume segment 1, or volume segment 4 next to volume segment 5, but not volume segment 3 next to volume segment 5. The resulting combined volume segment contains all of the original segments' data, in the same logical location as in the original two segments. The number of segments in the volume and in the segmented partition is reduced by one. This ability is especially useful when users have reached the maximum number of eight volume segments in a NetWare partition (at least two of which are segments from the same volume) and need to create additional segments in that partition.

The user determines which two volume segments will be combined. If necessary, any free space between the two segments is removed so that the two segments are directly adjacent to each other. Free space between the segments may be unaccounted space inside the left segment which is beyond the last block of that segment, or free space may be located between the two segments and not be in use by either segment. If the free space is not on a block boundary of the segments' volume then all sectors in one segment must be moved until the free space between the segments is on a block boundary or there is no free space between them. Once the segments are directly adjacent to each other, the merge is completed by adjusting the left segment's size to include the right segment's data and relocating the file allocation tables as necessary. The left segment becomes the single resulting segment.

Resize, move, and merge manipulations may be combined in various ways to consolidate the segments of a given volume, to scatter the segments of a given volume among several drives, and to efficiently manipulate segments when data duplication (mirroring or duplexing) is being used. Manipulations are performed in a manner which is safe and efficient. Other features and advantages of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings:

FIG. 1 is a partial cut-away view of a computer disk.

FIG. 2 is a diagram illustrating an IBM-compatible partition table.

FIG. 3 is a diagram further illustrating a portion of the partition table shown in FIG. 2.

DETAILED DESCRIPTION OF THE PREFERRED EMBODIMENTS

The present invention relates to computer systems, methods, signals, and configured storage media for manipulating volume segments and associated system data structures, and manipulating associated partitions and/or volumes, in computers which utilize segments.

Systems Generally

Figure 5:
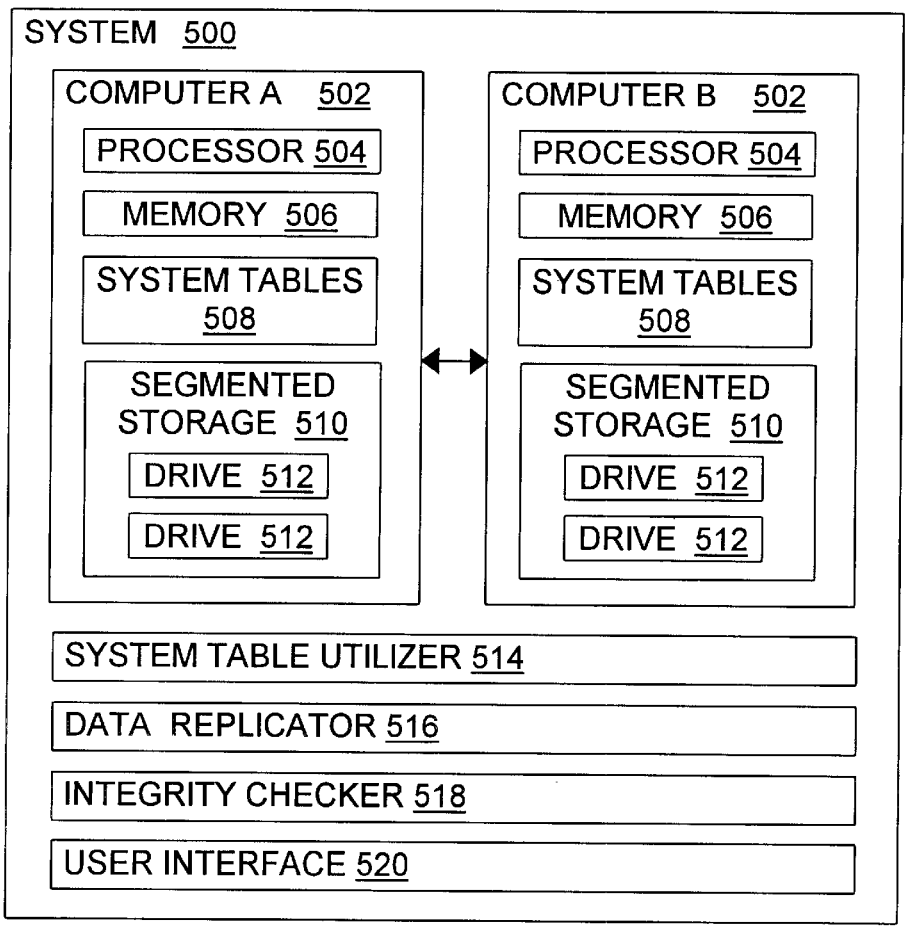
FIG. 5 is a diagram illustrating systems according to the invention.

FIG. 5 illustrates a system 500 according to the invention. The system 500 shown includes two computers 502 in order to make the point that segment manipulations may be performed remotely, that is, the manipulations may be controlled from a first computer 502 while being performed on segments of the second computer 502. However, a system 500 according to the invention may also contain only a single computer 502 (networked or standalone), or the system 500 may contain two or more computers 502 in a computer network which does not necessarily allow remote segment manipulation.

Each computer 502 includes at least one processor 504 for executing instructions, a memory 506 for storing instructions, system tables 508, and a segmented storage medium 510 for holding data in sectors in segments, partitions, and volumes. System tables 508 include, for instance, partition tables such as the partition table 200, file allocation tables, and NetWare volume definition tables familiar to those of skill in the art. The segmented storage medium 510 includes one or more non-volatile storage devices, such as magnetic or optical disk drives like the drives shown in FIGS. 1 and 4. The memory 506 and the segmented storage medium 510 can be written and read by execution of appropriate processor 504 instructions.

The illustrated embodiment includes two computers 502 connected by a network, modems, or other familiar means; some alternative embodiments include just one computer 502, while others include more than two computers 502. Each computer 502 is typically a server computer, but a computer 502 may also be a client in a server-client network or a peer in a peer-to-peer network or a standalone computer. A server computer 502 may be configured as an Internet server, as an intranet server, as a name server, as a file server, as an applications server, or as a combination thereof A given computer 502 may also function both as a client and as a server; this may occur, for instance, on computers 502 running Microsoft Windows NT or Windows 2000 software. The processor 504 may be a uniprocessor or a multiprocessor. Suitable computers 502 include, without limitation, servers, personal computers, laptops, and work-stations. Although particular computer system 500 components are identified herein, those of skill in the art will appreciate that the present invention also works with a variety of other systems.

Figure 4:
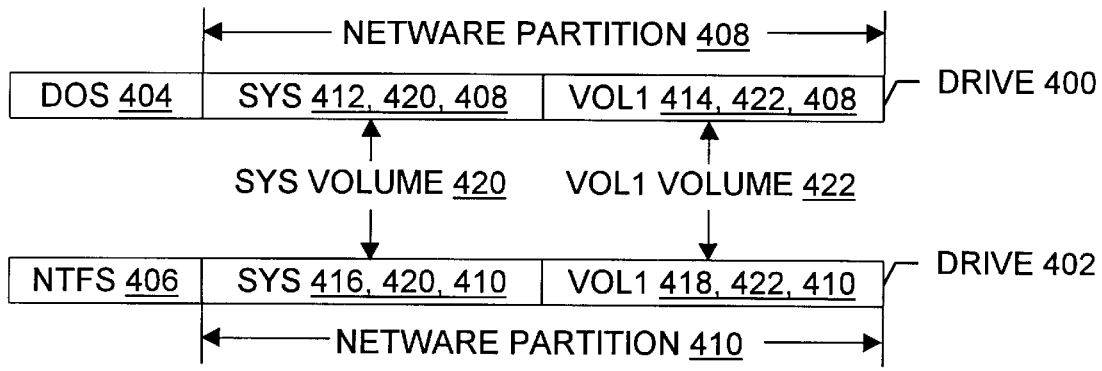
FIG. 4 is a diagram showing one of many possible configurations which illustrate the relationship between segmented partitions, other partitions, volume segments, volumes, and disk drives in a computer; these relationships are pertinent both to the prior art and to the present invention.

The system 500 also includes a system table utilizer 514 which is capable of extracting from the system tables 508 information such as partition boundaries, partition sizes, partition types, whether a partition is bootable, whether a partition is a segmented partition such as the NetWare partitions 408 and 410, segment boundaries, segment sizes, free space size and location, volume names, and other configuration information of the type illustrated in FIG. 4. The system table utilizer 514 is also capable of modifying the system tables 508 to reflect changes in such information once the changes are specified to the system table utilizer 514 and is capable of performing the modifications subject to locks and/or semantic constraints to maintain the integrity and self-consistency of the data which is stored in the system tables 508.

The system table utilizer 514 may be embodied in software which runs on the computer 502 and which reflects the semantic constraints imposed on partitions, segments, and volumes. Such constraints include without limitation the following:

no single sector belongs to two primary partitions, two logical partitions, two different segments, or two different volumes;

a segmented partition may not cover more than one drive;

a segmented NetWare partition can have at most 8 segments;

a NetWare volume can have at most 32 segments;

a volume set contains two or more partitions on one or more disks;

file allocation tables are typically installed at the beginning of each segment;

up to 16 mirrors of a given segmented NetWare partition can exist;

if one segment of a segmented NetWare partition is mirrored, all must be mirrored; and the file allocation table of one segment may point into data stored in another segment, including another segment on a different drive, so that a given file can span segments.

Other semantic constraints on partitions, segments, and volumes are also well-known. The system tables 508 and an executable copy of the system table utilizer 514 may be stored on one or more of the disk drives 512 in the segmented storage 510, but they are shown separately in the Figure for clarity of illustration.

One or more selected segments in the storage medium 510 may be moved, copied, resized, or merged to produce corresponding modified segment(s). During such manipulations it may be necessary to move user or system data from one location to another in the medium 510, or to update system structures. Such manipulations preferably move the data and system structures as little as necessary (unlike the FDISK or NetWare Administrator utilities approaches), and preferably always keep at least one copy of user data and system information stored on the disks to allow recovery if the manipulation is interrupted by power loss or another event that requires rebooting. The user data and system structures are copied, moved, and/or updated, as necessary, by a data replicator 516. Some environments allow files to be marked for purging; in such cases, the data replicator 516 may be configured to avoid copying purged (or to-be-purged) files.

The data replicator 516 replicates system and user data in one or more selected segments to produce corresponding modified segments, taking into account the requirements of the file system stored in the segment(s) and the semantic constraints on segments, volumes, and partitions. Partition manipulation and data replication systems and methods are discussed in general, and with attention to FAT, HPFS, and NTFS file systems specifically, in the following United States Patents ("incorporated patent documents"); those discussions are incorporated herein by reference:

U.S. Pat. No. 5,706,472 issued Jan. 6, 1998
U.S. Pat. No. 5,675,769 issued Oct. 7, 1997
U.S. Pat. No. 5,930,831 issued Jul. 27, 1999

In particular, some file systems, such as NetWare FS, support suballocation within clusters. In such file systems a given cluster may contain data belonging to more than one file. In this situation (and others) clusters are sometimes referred to as "blocks" or "file system allocation units". Suballocation may be supported to reduce the amount of allocated space that is not actually being used to hold data, when relatively large blocks are being used.

If a suballocated cluster needs to be resized, care is taken to correctly update the file allocation table or other file system structure that maps clusters to files. For example, suppose a suballocated cluster XY holds data from file XX and also holds data from file YY. If the cluster size is decreased, then clusters X and Y which are created from the larger cluster XY may each contain data from only one file. Of course, other new clusters may still contain data from more than one file, depending on the cluster sizes and data placement involved.

If the cluster size is being increased, then suballocation may make it possible to avoid moving data to make room for cluster expansion. Instead of moving the data, changes are made in the file allocation table to correctly map the larger clusters to the files whose data they hold. For example, suppose cluster A holds data only from file AA and suppose cluster B, which is adjacent to cluster A, holds data only from file BB. Then increasing the cluster size may create a suballocated cluster AB from the two smaller clusters A and B, with cluster AB holding data from both file AA and file BB.

The segment manipulations of the present invention may be used in conjunction with partition manipulations described in the incorporated patent documents. For instance, suppose a given server disk includes both a DOS partition and a NetWare partition. Tools and techniques described in the incorporated patent documents may be used to resize the DOS partition, while tools and techniques described in the present application may be used to resize the NetWare partition. In particular, during an upgrade process it may be helpful to resize a NetWare partition to make room for a larger DOS partition.

The software which facilitates data replication and embodies the system table utilizer 514 and/or the data replicator 516 may be loaded for execution from a drive 512 on the computer 502 that holds the selected partition. Alternatively, the implementing software may be loaded over a network or other connection from a file server or some other computer 502.

Strictly speaking, there is no modified segment, modified volume, or modified partition until the appropriate system tables 508 are updated, even if all the disk sectors that will lie in the modified unit have been updated to contain appropriate system structures and user data, because segments, volumes, and partitions are defined by entries in the system tables 508. However, for convenience the term "modified unit" means "intended or actual modified unit" where a unit is a segment, volume, or partition. That is, "modified unit" is used to denote both the unit that is produced from the selected unit and the collection of disk sectors which that modified unit is intended to occupy. Accordingly, one may speak of a modified partition, a modified segment, and/or a modified volume, based on an identified selected unit and an identified manipulation to be performed on the selected unit, even before the system tables 508 are updated and even if the replicating step is stopped before the system tables 508 are updated.

An integrity checker 518 performs checks to avoid data loss by verifying the integrity and internal consistency of data before segments, volumes, and/or partitions are manipulated. These integrity checks are discussed in detail elsewhere, including within the discussion of FIG. 6.

A user interface 520 provides users with control of the implementing program and feedback from that program. The interface 520 may be graphical or limited to text, and it may run locally and/or remotely with respect to a given computer 502. Particular embodiments of the user interface 520 may present users with menu structures including the ones shown below and with information tables like the one shown in FIG. 15. Technical details on performing the manipulations identified in the menus are given elsewhere herein.

Segment Options
  Move Segment
    Move Segment Left
    Move Segment Right
    Move to Other Free Space entry The Move Segment entries produce dialog boxes which show the free space before the segment, the free space after the segment, the valid movement range, and the amount by which the segment should be moved. The Move to Other Free Space entry shows a list of disks 512, corresponding segmented partitions, and corresponding free space locations and segments within the partitions.

A menu structure associated with a Move Volume Segment option is shown below Technical details on performing the manipulations identified in the menus are given elsewhere herein.

Move Volume Segment
  Move Left
  Move Right
  Move to Other Free Space

The user must select a current volume segment. The Move Volume Segment option is only enabled if there is valid free space to which the volume segment can be moved. When the user selects the Move Volume Segment option from the Volume Segment Options menu the valid options for that volume segment are displayed. If more than one of the Move Left, Move Right, or Move to Other Free Space options are available then the user chooses between them; otherwise only the Move to Other Free Space option is displayed. If Move Left or Move Right is selected, then the limits on how far this segment can be moved are displayed and the user enters the number of megabytes to move the volume segment.

If the Move to Other Free Space option is selected, then the user is presented with a list of available free space areas to which the volume segment can be moved. The user may also be given the names and locations of volume segments on either side of free space regions to help the user identify a desired free space region. The user selects one of the free space areas in the list, and a confirmation message is presented to the user to accept the move. As with other manipulations described herein, progress indicators may display the progress of the move as it proceeds. After completion of the move, the user is presented with a success message.

Discussion of the behavior of the system 500 components generally pertains to the methods of the invention, and discussion of the method steps likewise generally pertains to the system 500 and other systems according to the invention.

Methods Generally

Figure 6:
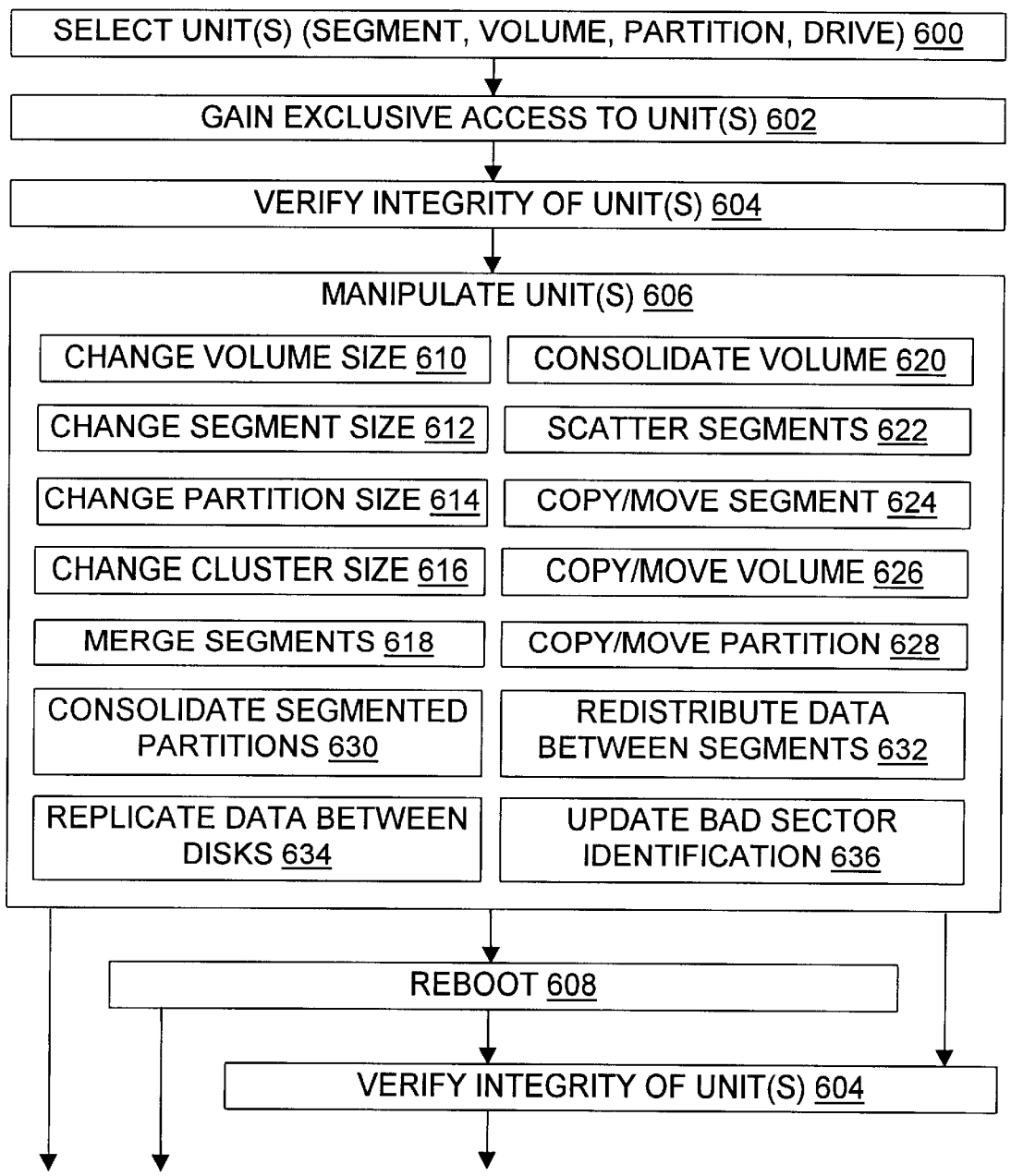
FIG. 6 is a flowchart illustrating methods according to the invention.
Figure 7:
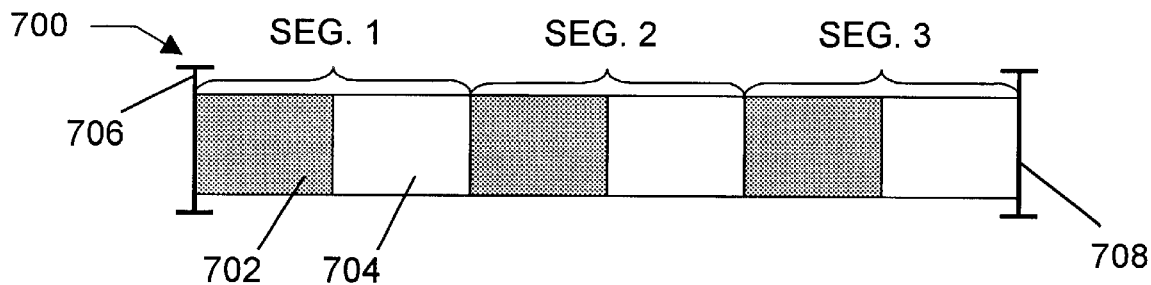
FIGS. 7 through 14 are diagrams of segmented partitions illustrating manipulations according to the invention.

FIG. 6 illustrates methods of the present invention for performing manipulations in systems that use segments. During a reading step (not shown), the system table utilizer 514 reads the partition table 200 and/or volume definition tables from the storage medium 510 into one or more corresponding memory structures, such as a C or C++ struct, a Pascal record, or the like.

During a selecting step 600, one or more units (segments, volumes, and/or partitions) is selected. Segments reside in volumes and partitions, so that selecting a segment implicitly also selects a volume and a partition. Likewise, selecting a volume implicitly selects all segments of the volume. Drives may also be selected units, depending on the manipulation. For instance, a target drive would be selected when segments scattered among several drives are to be consolidated on a single drive. Unit selection may be performed automatically by software driving the data replicator 516, but is more commonly accomplished interactively by a human user using an interface such as a graphical user interface (GUI) 520.

During a locking step 602, implementing software gains exclusive access to the segmented storage medium 510, or at least to the part of that medium 510 which holds and/or will hold the system tables 508, the selected unit(s), and the modified unit(s). This step is discussed in greater detail hereafter.

A verifying step 604 may be performed before and/or after a unit manipulating step 606 to check the internal consistency and integrity of system structures in the selected unit(s). Suitable verifying steps include steps performed by commonly used tools such as NetWare Administrator utilities, or VREPAIR; integrity checking functionality may be provided by a separate integrity checker 518 or by calling a suitably integrated conventional utility. Some file systems, including NTFS, include redundant copies of system information. This may be done by repeating structures such as the boot sector, or by storing the same information in different ways in different system structures, such as placing allocation information in both a bitmap and in system structures. The verifying step 604 preferably checks the internal consistency of all redundant copies of system information, in addition to checking the integrity of the system 500 in other ways.

The unit manipulating step 606 may perform one or more of the illustrated steps. These steps 610 through 636 are discussed in details at various points herein, and summarized here for convenience.

A step 610 resizes a selected volume by resizing its segments, a step 612 resizes a selected volume segment and a step 614 resizes a segmented partition; in each case, resizing changes the number of sectors in the selected unit. The step 606 can proportionally resize all volume segments of a given NetWare partition, in place or during a move to a new larger or smaller drive. The segment clusters may be resized during a step 616 that changes the number of sectors per cluster.

Volume segments can be merged during a step 618 or consolidated by gathering segments onto a single drive during a step 620 through a combination of resizing and/or moving. The system 500 may also separate existing segments by scattering them (through repeated segment moves) differently among several drives during a step 622.

During steps 624, 626, and 628, a copy of a segment, volume, or segmented partition, respectively, may be created, copied, or moved.

During a step 630 two or more adjacent segmented partitions are consolidated. Segment definitions and segment-specific file system structures such as file allocation tables are unchanged by partition consolidation. However, system tables such as NetWare volume definition tables are updated so that after consolidation the region which was previously split between the selected partitions belongs to the consolidated partition that was created from those selected partitions. For instance, if partition X contained segments A and B, and partition Y contained segment C, then consolidated partition XY will contain segments A, B, and C.

During a step 632 the system 500 may redistribute data between segments by moving data from one segment to another segment.

During a step 634 a segment, volume, or segmented partition can be moved to a different location in the storage medium 510.

In conjunction with one or more of these steps 610 through 634, a step 636 updates bad sector identifications, whether used for redirection or not. In at least some embodiments, all component steps 610 through 636 of the unit manipulating step 606 can be performed in the presence of data duplication, whether it is by data mirroring or by data duplexing.

An optional rebooting step 608 occurs in two situations. First, if the manipulating step 606 is interrupted by a power failure, process termination, or similar fatal event then rebooting may be needed to restart the system 500 and finish the manipulation. To avoid data loss in such cases, the implementing software should keep a copy of user data in persistent storage such as a hard disk at all times. A recovery partition indicator may also be placed in the system indicator 310, in a manner similar to that described in U.S. Pat. Nos. 5,675,769 and 5,706,472. Checkmarking, journaling, and/or other data recovery tools and techniques may be used to allow the implementing software to safely resume manipulation near the point of interruption.

A second situation involving rebooting arises when changes to the partition table 200, volume definition tables, or other system data need to be conveyed to an operating system. Some operating systems, such as Microsoft Windows operating systems, only read such system data from disk during the boot process. When no run-time API is available to update the operating system and the risk of data loss is severe without such an update, a reboot is needed.

The method steps discussed above and elsewhere herein may be performed in various orders and/or concurrently, except in those cases in which the results of one step are required as input to another step. Likewise, steps may be omitted unless called for in issued claims, regardless of whether they are expressly described as optional in this Detailed Description. Steps may also be repeated, or combined, or named differently.

More on Protecting Data

During an identifying step, the file system being used in the selected unit is identified by checking the system indicator 310 in the partition table 200. The system indicator may identify a segmentable file system such as NetWare FS or NTFS. However the identifying step may also identify a proprietary or in-progress unit which indicates that the manipulating step 606 was interrupted. Such system indicators include recovery partition indicators of the kind discussed in the incorporated patent documents, If the recovery partition indicator is present, recovery proceeds as discussed in the incorporated patent documents, subject to the specific requirements of segmented environments discussed here. For ease of illustration, we therefore concentrate now on the case in which a segmented partition and/or segmented volume is identified (the presence of one or the other might be easier to detect on a given system).

During a checking step, the file system status is checked to determine whether the system 500 is in a known state, that is, a state in which necessary assumptions about file system structures hold true. In NTFS, the system 500 is presumed to be in an unknown state if a volume's "dirty bit" is set. The dirty bit may be set, for instance, if power to the computer is shut off before the file and operating systems have shut down, or if a disk I/O operation is interrupted. Presence of a recovery partition indicator does not necessarily indicate an unknown state; the state may be unknown to conventional operating system or file system software but known to implementing software in an embodiment of the present invention.

It may be possible to move the system 500 into a known state by rolling back operations logged in a log file or other means. However, it is presently preferred that unit manipulation software according to the invention simply clean up and exit during an exit step if the system 500 is in an unknown state. Cleaning up involves releasing temporarily allocated memory or disk space, replacing any recovery partition indicator with a conventional value, and otherwise placing the partition in a condition that presents no unpleasant surprises to NetWare Administrator utilities, VREPAIR, other pertinent software, or the user. If the system 500 is found or placed in a known state, unit manipulation may proceed.

During the locking step 602, software embodying the invention gains exclusive access to at least the pertinent part of the segmented storage medium 510. For instance, caching and virtual memory must be disabled, or at least restricted, to prevent any inconsistency between sector locations that are indicated in the memory 506 and the actual location of the sectors on the drives 512. This could be accomplished by flushing and then disabling the cache. In some embodiments, exclusive access is obtained by performing critical disk operations under an operating system such as DOS which does not support multitasking. In other embodiments, such as some Windows NT embodiments, exclusive access is obtained by running unit manipulation software before the boot process initializes virtual memory and caching subsystems of the system 500.

During a target identifying step, the software identifies source and target replication areas, based on the manipulation(s) to be performed. Checks are made using the system table utilizer 514 to ensure that the target area is not already in use. Source and target areas identified by a user during step 600 through a GUI or other interface 520 are translated into drive identifiers, partition identifiers, logical sector numbers, <cylinder, track, sector> triplets, and/or other identifiers as appropriate, to identify the areas to the data replicator 516. Checks are made to determine whether volume spanning, volume sets, stripe sets, mirror sets, or other mechanisms that divide data between disks or between partitions are in use, and the source and target areas are identified on multiple disks as appropriate whenever units may span drives.

During bad sector handling in steps such as step 636 and other portions of step 606, measures are taken to detect and handle bad sectors. For instance, a selected unit may be expanded to cover additional area, which is preferably checked for bad sectors to avoid attempts to write data to a bad sector. Likewise, copying or moving a unit may produce a modified unit that covers an area of the storage medium 510 containing bad sectors that should be avoided. Areas that already contain data are vacated if they either need to receive different data or need to be emptied to create holes that will match bad sectors. Bad sector handling may be file-system-specific. For instance, NTFS allocates bad clusters to the bad cluster file in a sparse file format when those clusters are identified as bad during an initial FORMAT invocation. The sparse file format recalls the sparse file approach used in UNIX and POSIX systems. Bad sectors may also be found during ordinary use of the file system when an attempt is made to access data. Bad clusters are added to the bad cluster file in a compressible sparse file format.

The data is replicated during a replicating step and corresponding adjustments are made to the system structures during step 636. One procedure for relocating data in NTFS or similar file systems is the following:

While there are set bits in the volume bitmap for the region of clusters being vacated,
  For each file in the master file table ("MFT"),
    For each run of clusters contained in the file being tested (all data streams),
      If the run being tested is wholly or partly in the region of
      clusters being vacated,
      If there is a blank area in the region of clusters being retained that is the size of the run being tested,
        Set the bits for the blank area in the volume bitmap.
        Copy the data from the area mapped by the old run to the blank area.
        Change the run in the file to point to the new area.
        Clear the bits representing the old run in the volume bitmap.
      Else
        Locate several runs in blank areas whose sizes total the size of the portion of the run that is in the region of clusters being vacated.
        Set the bits for the new areas in the volume bitmap.
        Copy the data from the area mapped by the old run that are in the area being vacated to the new runs.
        Calculate the new run map for the file.
        If the new run map is too large for the current MFT File
        Record for the file, including all of its extensions
        If the MFT does not contain any blank entries,
          If the MFT has a multiple of 64 entries,
            Add 64 clear bits to the MFT bitmap.
          End if
          Add blank entries to the MFT, adding enough clusters to it to hold the new File Records and formatting the entries as blank entries, and preferably adding
            enough to give the MFT a multiple of 8 entries.

End if
Format the next available position in the MFT as an
extended File Record.
Set the bit in the MFT bitmap for the new File Record.
If this is the File Record for the MFT itself (File Record 0),
    Move the run map minus the runs describing the
    first 16 File Records from the base File Record to
    the new File Record.
Else
    Move the entire run map from the base File Record
    to the new File Record.
End if
If the base File Record lacks an ATTRIBUTE_LIST attribute,
    Create an ATTRIBUTE_LIST attribute.
End if
Store the calculated run map in the File Record.
Clear the bits representing the old run in the volume bitmap.
    End if
  End if
 End if
End for
End for
End while When replicating or vacating, the following aspects of manipulating partitions containing NTFS and similar file systems should be noted.

If multiple data streams are allowed, each file must be checked for them. Thus, the software may contain an outer loop that steps through the files, with an inner loop that steps through the data, replicating or vacating the data streams. The MFT and other system structures are treated in many ways as if they were simply user files, at least as far as moving their constituent sectors is concerned. The log file and the security descriptors, for instance, are replicated and/or vacated just like user data. Compressed files are preferably not decompressed, but merely treated as bit streams.

Full support for large disks may require the use of sixty-four bit variables to hold sector numbers. Although shorter variables (such as thirty-two bit variables) may be used with many partitions on many systems, the larger variables are preferred. Similar considerations apply to variables that hold cluster numbers and file descriptors.

Some file systems use Unicode names for files and directories. If file names are required to be kept alphabetical, for instance, during a resizing manipulation, it is necessary for the software to be capable of sorting Unicode strings. It is also desirable to be able to display Unicode names to the user in status and error messages. If the file system uses case-insensitive names, the verifying step 84 may also check the Unicode case equivalency table.

POSIX or similar file systems may create multiple names for a given file, often called "links." This should be considered during the verifying step 84, so that links do not lead to spurious error messages.

The difference between system and user areas, which is quite well defined in FAT, is blurred in NTFS and may be blurred in other file systems. User data may be resident in NTFS system structures or it may be external to them. This must be kept in mind when file system structures are manipulated to avoid losing user data or damaging system integrity. Also, if all user data is resident there is no need to check for it during replication after the system structures have been copied or moved, because the resident user data will already have been copied or moved with the system structures.

The format of the balanced trees, balanced B trees, B+ trees, and other directory tree data structures used to hold directory information in some file systems must be reflected in the software; these structures are radically different from the directory structures used in FAT file systems, but are well-documented. Those of skill in the art will readily combine programming skills and knowledge of directory tree data structures with partition manipulation techniques of the type discussed here and in the incorporated patent documents in order to maintain the internal consistency and integrity of file system directories during manipulations.

File system structures which are maintained as files may generally be relocated to new positions within a partition (new relative to an edge of the partition) just as any user file is relocated. However, some versions of NTFS store the boot sector or boot sector copy at a predetermined location, such as at one end of the partition or in the middle of the partition. Thus, when an NTFS partition is manipulated, it may be necessary to move the boot sector or boot sector copy to the corresponding location (e.g., end or middle) within the modified partition, having first ensured that the new location has been properly cleared.

In one embodiment, a journal is kept in which the operations performed by the software's system table utilizer 514 and data replicator 516 are recorded in order. This allows the same sequence of manipulation operations to be automatically' repeated on another unit and/or another computer, thereby making it easier to modify a large number of units on one or more computers 502 in a given way. For instance, it may be desirable to create a new segment on each machine. This might be done with a playback sequence that shrinks an existing large segment and then creates a new small segment in the space just made available. In one embodiment, the list of operations can be edited. In some embodiments, the operations can be undone, either one-by-one or all at once. This allows a user to recover the original selected unit(s) from the modified unit(s). The undo facility also allows administrators to experiment with different possibilities while creating a playback sequence. Journaling is discussed at least in U.S. Pat. No. 5,675,769. Operation lists may be readily implemented by those of skill in the art using C++ classes, or similar linked structures or arrays.

In one embodiment, system tables are written to disk in a fail-safe manner. For instance, a new updated copy of a file allocation table is written to disk in a different location than the old copy while the old copy is still on disk and is still referred to by the system tables. When the new file allocation table is safely written to disk, the system table that identifies where the file allocation table is located is updated to refer to the new file allocation table. After this the new file allocation table is rewritten in its default location and the system tables that refer to the file allocation table are again updated to refer to this final copy of the file allocation table. If a system failure occurs while the file allocation table is being written out to disk, the file system is still intact because the previous file allocation table is still referenced by the system tables. This same approach applies to the directory table.

Resizing Segmented Partitions: Proportionality, "Inchworm" Approach

When resizing a segmented partition during step 614, the segments may be resized proportionally to achieve the desired partition size. In one embodiment, this involves taking the desired partition size specified by the user and rounding it to a cylinder boundary. If one is reducing the partition size, the default redirection area (if present) is determined. The remaining space in the resulting partition is then divided among the segments in the partition. Each segment's new size is calculated on a proportional basis relative to the total free space in all segments. For example, if a segment contained 10% of the unused sectors of all the segments in the partition before resizing, then it will still have 10% of the unused sectors after resizing the partition.

If the right edge is being changed to achieve the resize, then the new sizes and positions of the segments are calculated from left (the fixed boundary) to right. If the left edge is being changed, then the new sizes and positions are calculated from right (the fixed boundary) to left, that is, in the opposite direction. This order is used because each segment's new starting position is dependent upon the previously calculated segment's position and size. The first segment calculated is always the one with the fixed boundary. As each segment is reduced in size, the free space recovered from the segment will be between it and the next segment to be resized. This free space must be calculated to be on a block boundary that is a multiple of the following segment's volume block size, so that the free space can be temporarily incorporated into the following segment as it is positioned in its new location and resized to its new size.

This "inchworm" approach optimizes the task of resizing a partition smaller. The entire segment is not moved to its new position. Instead, only the sectors in a segment that must be vacated to make room for the following segment are moved sequentially.

As another example, resizing a partition smaller by adjusting the right edge is illustrated in FIGS. 7 through 14. Assume a segmented partition 700 has three 100 Mb segments, each of which has 50 Mb of unused sectors. Thus, segment 1 includes 50 Mb of data 702 and 50 Mb of unused space 704. Segment 1 is near the left partition boundary 706, and segment 3 is near the right partition boundary 708. The partition is being reduced by 60 Mb, so each modified segment will be 80 Mb in size instead of the current 100 Mb. For clarity, assume the data in each segment is only in the first 50 Mb of each segment. For instance, in the first segment the unused space 704 is to the right of the used space 702.

Figure 8:
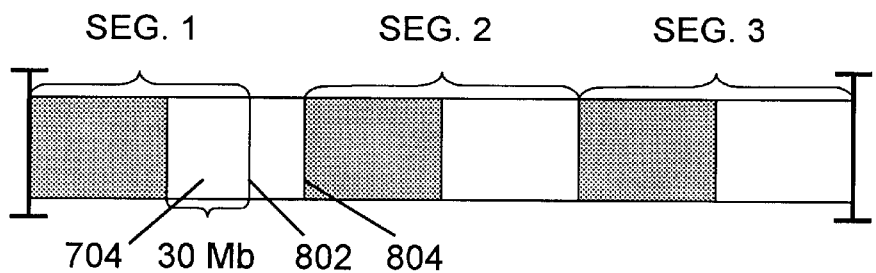

The starting positions of the second and third segments must be changed to consolidate all the segments at the left of the partition. FIG. 8 shows the first step, by which the right boundary 802 of segment 1 is moved to the left of segment 2's left boundary 804 by 20 Mb. The free space 704 now contains 30 Mb, and segment 1 is now 80 Mb in size.

Figure 9:
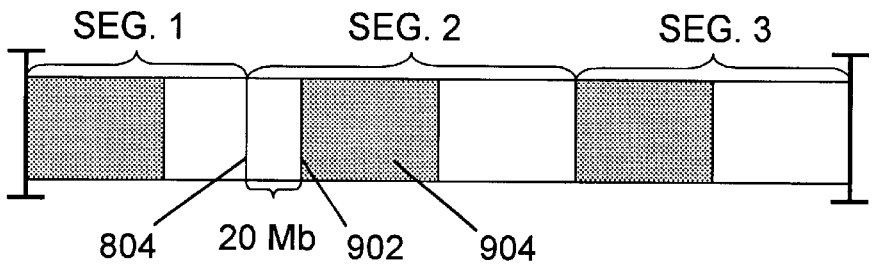
Figure 10:
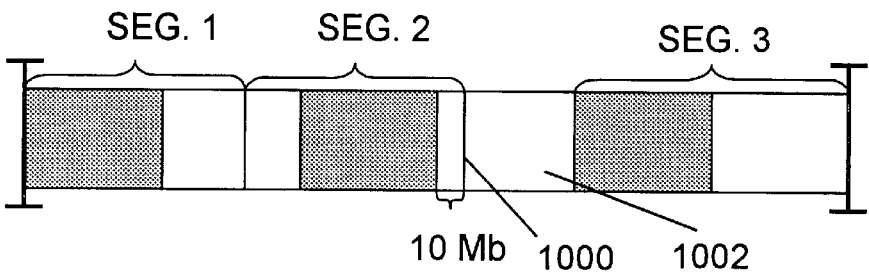

To shift and resize segment 2 in this example, no data are moved. FIG. 9 shows the left boundary 804 of segment 2 after it is moved 20 Mb to the left; the left boundary 902 of the data block 904 is unchanged. As shown in FIG. 10, the right boundary 1000 of segment 2 is then moved 40 Mb to the left. Because the boundary 1000 moves only through free space 1002, no data need to be moved.

Figure 11:
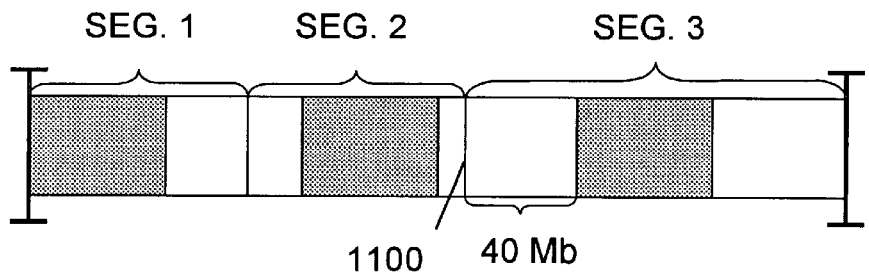
Figure 12:
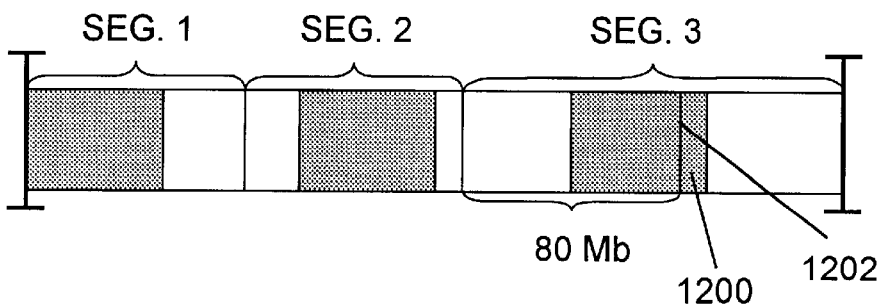
Figure 13:
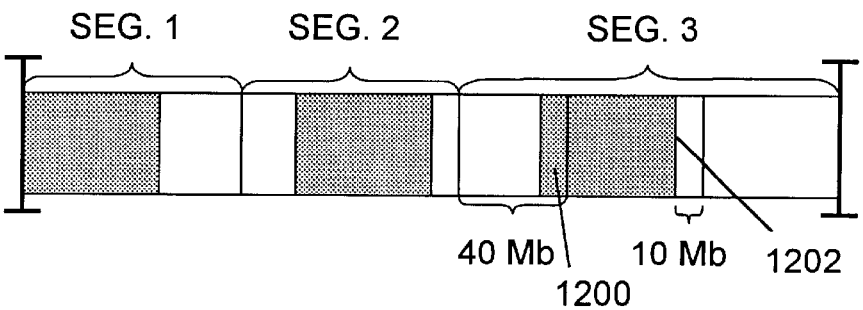
Figure 14:
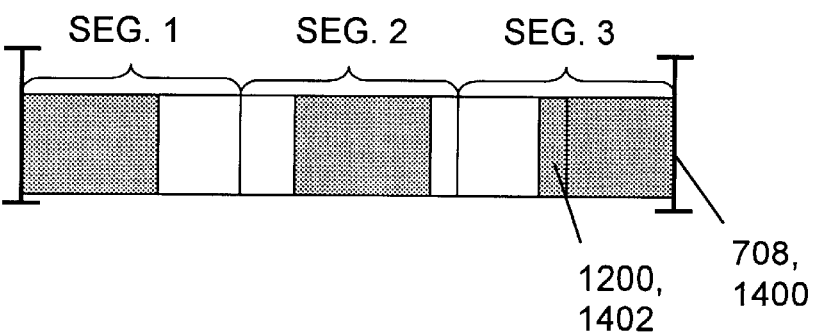

As shown in FIGS. 11 through 14, segment 3 is shifted and resized without moving all of its data; only 10 Mb of data is moved. First, as shown in FIG. 11, the left boundary 1100 of segment 3 is moved 40 Mb to the left. Then the right boundary of modified segment 3 is determined by measuring 80 Mb to the right from the new left boundary 1100. The measurement reveals that 10 Mb of data 1200 would lie outside of the modified segment right boundary 1202. This 10 Mb of data is moved from its original location to a new location within free space in segment 3. Finally, the right partition boundary 708 is moved left to its new location.

This "inchworm" method is much faster than moving all 100 Mb of data in the second and third segments, as one could do by moving each segment left en masse after resizing it smaller. A similar procedure applies to resizing when moving the left edge, but the segment positions and sizes are calculated from right to left.

Although this discussion speaks of "moving" boundaries, a second and equally valid perspective takes the view that a boundary is removed and then replaced by a new boundary which plays a role similar to the former boundary but does so in another location. Thus, one could also say that the right partition boundary 708 is removed and a replacement right partition boundary 1400 is created. Similar observations apply to segment boundaries, and to data blocks such as the block identified as 1200 or alternatively as 1402. The question of whether boundaries and data are (a) moved, or (b) removed and replaced, is a matter of definitions and possibly of specific implementations, and so is separate from the fundamental teachings and beneficial results of the present invention.

Resizing a Segmented Partition by Moving its Left Boundary

In some embodiments, a segmented partition such as a NetWare partition can only be resized by moving the partition's right (distant from the file allocation table) boundary. However, in some embodiments such a partition can be resized by moving its left (near the file allocation table) boundary. One method for resizing a NetWare partition from its left boundary is described in detail below. Those of skill will readily adapt these details for use in resizing other segmented partitions from the left, and to a lesser extent, in resizing segmented partitions from the right boundary.

Pre-Resize
1) Get limits
   a) Get partition limits
      i) Determine free space in the partition
         (1) Get free space for each volume segment
      ii) Force partition to be no larger than the maximum of the smallest mirror
   b) Get redirection area limits
   c) Get logical data area limits
2) Validate new size specified by user
   a) Force desired size to be on a cylinder boundary
   b) If reducing partition size, calculate default redirection area size based on new partition size
      i) Adjust free space between redirection area and first volume segment to be on the first volume segment's block boundary
      ii) If changing left boundary, force alignment of redirection area and logical data area ("LDA").
         (1) The free space on the right side remaining after the redirection area must be on a block boundary that is the same as the first segment so the free space can be incorporated into the first segment during resize. This is the case when the first segment's block size is larger than the redirection area's block size.
         (2) Also, the size of the redirection area must end so that the existing (selected) LDA still starts on a 4k block boundary. Sectors that are not on a block boundary between the size of the new (modified) partition and the new redirection area + new LDA must be added back into the end of the redirection area to keep the LDA on the 4K block boundary.
    (3) If there is no redirection area and the resize will cause the new LDA to not be on a block boundary from the new start of the partition, then force the partition to have a minimum size redirection area so we can add the unaligned sectors to its size to make the LDA align on a 4K block boundary with the partition start.
  c) Force new logical data area to be no larger than the maximum logical data area of the smallest mirror
    i) Calculate proportional volume segment sizes based on new logical data area size. Count free space between end of logical data area and end of partition as available free space.
    ii) Don't count non-block sectors between the last segment and the end of the LDA if anchor (non-moving boundary) is on the right since they can't be incorporated into the last segment doing an "inchworm" type move.
    iii) Determine free space to be removed from volume segment
    iv) Force end of new volume segment to be on a volume block boundary
    v) Try to recover lost blocks due to boundary rounding
    vi) If there is a volume segment that will be moved next to the segment being worked on, adjust the free space between the segments so it ends on a block boundary of the next volume segment
    vii) Set new starting location of segment directly after the previous segment or redirection area Resize 3) Check integrity of partition, volume segments, and associated volumes
4) If resizing the right boundary, resize the redirection area if present
5) Resize volume segments within the partition if reducing partition size
  a) If free space exists between LDA end and partition end, increase LDA size to include it so the last segment can move as far to the end of the partition as possible.
  b) If resizing the left edge and there are sectors unaccounted for between the last block of the segment and the end of the segment, realign the end of the segment so the unaccounted sectors are moved into the unused LDA space after the segments.
  c) If there is free space after the volume segment increase segment size to include it
    i) Set internal tables for volume segment and volume to the new segment size
    ii) Create a new file allocation table object based on volume size
    iii) Insert entries in file allocation table for new blocks
      (1) Generate a "moved map" of blocks whose index has been adjusted
    iv) Update directory from moved map of blocks whose index was adjusted
    v) Temporarily extend the file allocation table using any free blocks available
    vi) Write new volume definition tables, file allocation table, and directory to disk
    vii) Generate a "vacate map" of blocks that need to be moved to make room for system blocks
    viii) Vacate blocks needed for system blocks specified in the vacate map
    ix) Generate new file allocation table chain in default location of file allocation table
    x) Write new volume definition tables and file allocation table directory to disk
  d) Reduce segment size
    i) Get a file allocation table for the segment's volume and restrict it to the blocks in the segment
    ii) Generate a vacate map of blocks that need to be moved to make room for system blocks
      (1) Insure there is enough free space to vacate future system blocks
    iii) Add to the vacate map the blocks that are to be relocated to reduce segment size
      (1) Insure there are enough free blocks to vacate blocks
      (2) For each block in the region select a block outside the region to where it will be moved
      (3) Mark target block as unavailable
    iv) Vacate the blocks specified in the vacate map
      (1) Check integrity of vacate map
      (2) Move blocks that can be moved directly (their target block is free) until all are moved
      (3) Build a job list until no more free jobs
        (a) Place blocks in active job list
        (b) Update moved map and file allocation table for blocks put on active list; file allocation table target entries still have old "next" values in them.
        (c) Set flag to update directory entry if block is first in file chain
      (4) Read all blocks on the job list
      (5) Write all blocks on the job list
      (6) Move blocks that must be moved indirectly (their target block is not free) until all are moved
      (7) Update the children of each file allocation table entry; "next" values in all file allocation table entries are updated to have the values from the vacate map
      (8) Write file allocation tables to disk
      (9) Update directories if update directory flag was set; update first block value that was moved to have the value from the file allocation table map
      (10) Update the job list to write the indirect moves to their final location
    v) Delete entries from file allocation table for blocks that have been relocated (1) Generate a "moved map" of blocks whose index has been adjusted
    vi) Set internal tables for volume segment and volume to the new segment size
    vii) Generate new file allocation table chain in default location of file allocation table
    viii) Update directory from moved map of blocks whose index was adjusted
    ix) Write new file allocation table, directory, and volume definition tables to disk
6) If increasing partition, update partition table
7) Change logical data area size in NetWare tables
8) If resizing left edge and there needs to be a redirection area where there was not one before, create it. If one already exists, resize it down if partition size is decreasing.
9) If decreasing partition size, write new partition size to partition table
10) Clear any redirected blocks that will be outside the new LDA, and adjust redirection tables due to removing or adding blocks in the LDA.
11) Resize mirrored partitions
12) Check integrity of partition, volume segments, and associated volumes Resizing Volume Segments One process for resizing a volume segment during step 610 or step 612 begins by reading in the file allocation table for the segment's volume and restricting it to the blocks in the segment. If the segment is increasing in size the in-memory copy of the system tables describing the segments are updated to reflect the larger resulting segment. Also, the file allocation table is temporarily extended using any available free blocks to match the new larger size of the segment. At the same time, the in-memory copy of the directory is updated so that all entries which refer to sectors beyond the new area being added have their sector values increased to reflect the new sectors added in the segment being resized. Each of these in-memory system structures is then written to disk.

If the segment is decreasing in size, a "vacate map" is generated identifying blocks that need to be moved from the area in the segment being deleted. File allocation table entries for blocks that have been relocated are updated in the file allocation table, the directory is updated for any blocks that were moved, and the file allocation table and directory are written to disk. Then the in-memory copy of the system tables describing the segments are updated to reflect the smaller resulting segment. The in-memory copy of the directory is updated so that all entries which refer to sectors beyond the area being deleted have their sector values decreased to reflect the sectors being deleted in the segment being resized. Each of these in-memory system structures is then written to disk.

Next, whether one is increasing or decreasing the segment, the embodiment generates a "vacate map" identifying blocks that need to be moved to make room for system blocks that will be written out in their default location. The blocks specified in the vacate map are copied to free blocks in the area of the segment that will remain after the resize has completed, thereby freeing that space. A new file allocation table chain is generated at the default location of the file allocation table and written to disk. If the beginning location of the file allocation table changed when it was written to its default location, then the volume definition tables are again written to disk, so they refer to the correct starting location of the file allocation table.

More particularly and with regard to the user interface, because either the left or right edge of a volume segment can be moved to resize the segment, there may be two options on a Segment Options menu in some embodiments: one for moving the right boundary and one for moving the left boundary. One, both, or neither of the options may be displayed on the menu, depending on which boundaries can be moved.

Figure 15:
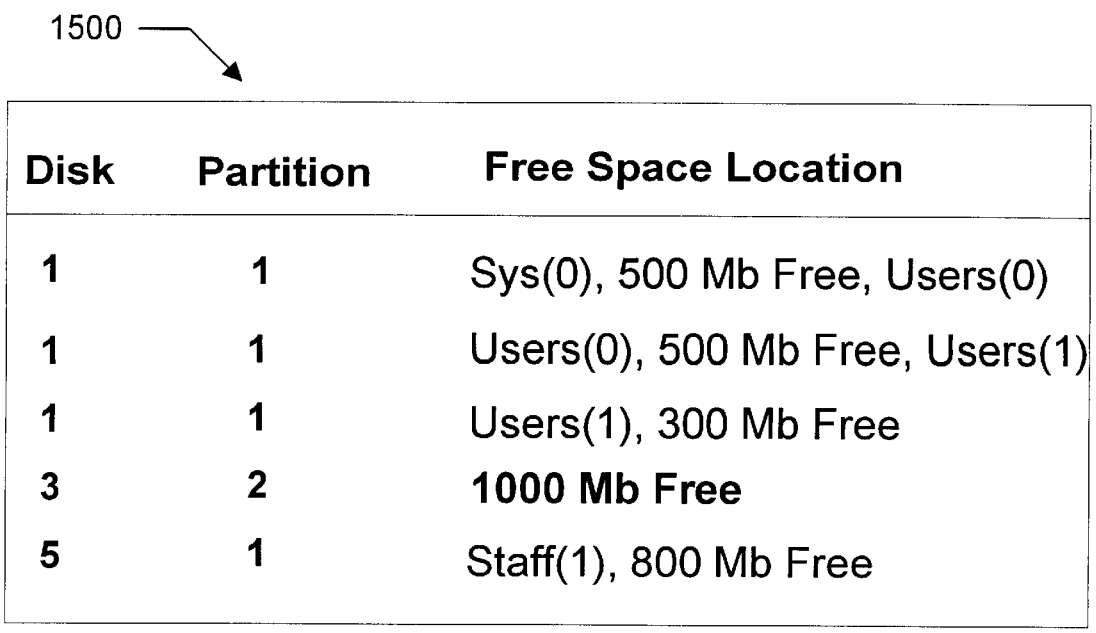
FIG. 15 illustrates a user interface structures in an implementing program according to the invention.

After selecting resize from the Segment Options menu, the user is presented with a dialog describing the limits of how the segment can be resized. This dialog displays the current volume segment size, the free space after and/or before the segment, and may also show the minimum and maximum sizes to which the segment can be resized. FIG. 15 shows an example table 1500 which illustrates information that can be provided to users. Raw information of the type shown can be given directly to users, or the information can be processed to determine constraints such as the maximum or minimum size of a unit and the free space locations large enough to receive a (copy of a) unit. In the case of segment resizing, the user enters a value for the new segment size between the minimum and maximum valid values. A confirmation dialog preferably follows this dialog. If free space is only available on one side of the volume segment, then only a single Resize option will be available on the Volume Segment Options menu.

With regard to data structures, significant additions and changes would need to be made to a product such as the PowerQuest PartitionMagic product (PARTITIONMAGIC is a registered mark of PowerQuest Corp.) to implement the present invention. For instance, new classes would be added to describe the limits to which a volume segment can be moved during steps 624, 634 or resized during step 612. New classes would be added to model the NetWare file allocation table and the NetWare directory, to describe entries in the directory, and otherwise represent the system tables 508 as needed. In a product according to the incorporated patent documents, existing classes might be expanded to provide functionality which supports resizing volume segments (as opposed to resizing non-segmented partitions such as FAT partitions). Information maintained on disk in the volume definition table may be managed in a NetWare-specific partition class, a NetWare volume class, and a volume segment class. Changes to conventional system tables are not necessary except as described herein.

In one embodiment, errors are passed up to the user interface 520 through an error return code, and any errors during a resize process during steps 610 through 616 would end the resize prematurely. The resize would still be failsafe, because each incremental operation in the process can be completed independently of the other operations. The process can be halted between operations without causing damage to the user's data.

During implementation, the developer should use the parameters described below to test reliability. Segment resize should be tested using each possible volume block size (e.g., 4 KB, 8 KB, 16 KB, 32 KB, and 64 KB for NetWare FS). Segment resizing implementation should be tested by resizing a volume segment that has a long namespace in it with file names longer than 128 characters. Segment resizing should be tested with a NetWare volume that has a Macintosh namespace added to it and in which a Macintosh client has put files on the volume. Tests should resize a volume segment that has a file with redirected blocks that are in the area of the segment being vacated to reduce the segment size. In particular, the developer should verify that the file containing the redirected blocks is still correct after the resize.

In some embodiments users can select various options when resizing two or more segments within a volume. For instance, the following choices could be allowed:

each segment in the volume can be resized down to its used space; and a given segment can be resized below the apparent minimum threshold (namely, its used space) by moving data from that segment into one or more other segments of the volume, resizing the receiving segment(s) larger if that is necessary and possible.

More generally, some embodiments allow blocks to be relocated from one segment to another segment within the same volume. This allows a user to decrease the size of the segment even below the amount of used space within the segment, if there is free space available in one or more other segments of the volume.

A combination of moves and/or resizes can be used to place all segments of a volume on a single drive (i.e., consolidate the segments during step 620), thereby increasing fault tolerance. For instance, suppose a first drive D1 contains segment S0 and segment V0 belonging to volume SYS and volume Vol1, respectively, and a second drive D2 contains segment S1 and segment V1 which belong to the SYS volume and the Vol1 volume, respectively. With the invention, the segments can be rearranged so that segments S0 and S1 are adjacent to each other on drive D1 and segments V0 and V1 are adjacent to each other on drive D2. The invention can then be used to merge segments so that a single segment S0 contains all data of the SYS volume on drive D1, and a single segment V0 contains all data of the Vol1 volume on drive D2. Of course, many other manipulations are likewise made possible by the invention.

The tools and techniques used in moving, copying, and resizing entire volume segments may also be adapted for use in moving data from one segment of a volume to another segment of that volume during the data redistribution step 632. Segments may be resized larger to receive data being redistributed, and segments may be resized smaller after some of their data is redistributed to one or more other segments. However, segment resizing is not needed in every case of redistribution, since free space may already be available in the target segment and adding free space to the source segment may be acceptable, or may even be a goal of the redistribution.

Resizing Clusters

A NetWare or other administrator may wish to change the allocation block size (i.e., cluster size). Cluster size affects disk utilization because the system 500 wastes different amounts of disk space based on the choice of block size.

Resizing clusters larger during step 616 is accomplished generally by changing the "blocks in the segment" and the "sectors in the segment" in the system tables 508 to reflect the new volume segment size. Then the implementing program calculates the added file allocation table blocks needed and extends the file allocation table chain associated with the file allocation table blocks by the appropriate amount.

More precisely, the implementing program traverses the file allocation table chain of each file, vacates the block in the file allocation table allocated immediately following the current file allocation table block (if it is used), moves the next block in the file allocation table chain to the next consecutive just-freed-up block, and repeats until the new larger block size is filled. When a consecutive larger block has been built by moving the smaller blocks next to each other, the larger block is allocated in a new file allocation table which is being manipulated along with the old one. Lastly, the file allocation table chain for the file allocation table is adjusted to a new size which reflects the size of the volume and how many entries are required with the new block size to address all the volume blocks. The beginning of the Logical Data Segment (the data segment of the volume) may be aligned by padding or adjusting the "starting sector" variable in the Volume Segment Definition Table.

Resizing clusters smaller during step 616 is accomplished generally as follows. The "blocks in the segment" is reduced, the "sectors in the segment" is decreased, and then the file allocation table is evaluated. Each allocated block beyond the designated end is replaced by allocating a file allocation table block which does fit in the new segment size. Lastly, the file allocation table chain is reduced in size so that it reflects the new segment size.

That is, changing the block size to make it smaller is accomplished by building a new file allocation table, traversing the old file allocation table, and adding blocks to the new file allocation table chain so that what was pointed to by one block may now be pointed to by multiple file allocation table entries. Care is taken to mark the new file allocation table when unused portions are large enough to be allocated to a complete block, considering the new block size. These new blocks are marked as unused in the new file allocation table.

Cluster resizing teachings from the incorporated patent documents may also assist those of skill in implementing cluster resizing in segmented partitions.

Moving or Copying Segments

One process for moving segments begins by checking the integrity of the source and destination partitions and the segment's NetWare volume (for instance, by checking volume information in a volume object in memory) during step 604. This will in turn check the integrity of each of the volume's segments. Next, the software obtains handles to the source and destination NetWare partitions.

If the move in step 624 is an overlapping move to the left or right, the system 500 temporarily resizes the volume segment to a larger size so that it includes the number of blocks in the free space by which the segment will be moved. This is done by moving the side of the volume segment in the direction of the move, e.g., moving the segment right side out to move the segment to the right. Then the segment is shrunk back down to its original size by moving the other edge in the direction of the move, e.g., moving the segment left side further to the right to restore the segment's original size.

In a non-overlapping copy or move to the left or right, or a copy or move to other free space, the following operations are performed. First, as much memory as possible is allocated to the buffers which will be used to copy sectors of the volume segment. A used block bitmap for the segment being moved is then generated. An optional bad sector check is performed on the destination sectors; this check may be omitted, subject to the risks and speed trade-offs discussed in the incorporated patent documents.

The data replicator 516 then loops, repeatedly assigning as many disk blocks to memory buffers as buffer size will allow, reading the source blocks, and writing to the destination blocks, until the entire segment has been copied or moved. If source blocks have been redirected to a redirection area, due to bad sectors in the source or destination partition, then the blocks are correspondingly read from or written to the redirection area. This is accomplished by the data replicator 516 checking the source and destination block ranges against sectors that are known to be redirected in either the source or destination partitions. Then the redirected blocks are relocated from the redirection area to the new segment location and the logical data area.

In the case of a move, the volume segment is removed from the source partition's list of volume segments and linked into the destination partition's list. The moved segment's position on its volume's list of segments remains unchanged, because the moved segment's ordinal position in the volume stays the same. In the case of a copy, the copy is treated as a new segment which happens to contain data identical with the data in the original segment. The volume definition tables of the source and destination partitions are updated to reflect the movement or addition of the segment. The process of moving a segment requires changing the pointers in the volume definition table so that the "starting sector" number is modified to show the new starting place on the disk. Finally, the integrity of the volume of the segment that was moved and the integrity of the source and destination partitions is re-verified.

Errors are handled as discussed in connection with the segment resizing process. With regard to testing an implementation of this section of the invention, a volume segment should be moved to:

a partition where no other segments of the same volume exist;

a partition that is on a different physical disk 512; and new locations to the left and the right in the same free space area.

A volume segment which has a file with redirected blocks should be moved to a new location and then it should be verified that the file containing the redirected blocks is correct.

Moving or copying one or more segments which are subject to data duplication through mirroring or duplexing proceeds much as described above. However, the invention can detect that a segment is being mirrored, for instance, and move or copy the segment from a single source to dual destinations by invoking the mirroring capabilities of NetWare or another data duplicating means which coordinates with the data replicator 516. For instance, suppose a NetWare partition on a 4 GB drive is mirrored to a second 4 GB drive, and the partition is to be moved with the invention to a new 9 GB drive. The new 9 GB drive is accompanied by a second 9 GB drive for mirroring. By enabling mirroring during the data replication, the invention can automatically produce a mirrored target partition on the 9 GB drive. Similar coordination may be provided for data duplexing. The data replicator 516 and system table utilizer 514 may also manage volume sets and/or stripe sets in an analogous manner.

Merging Segments

One method for merging segments begins by checking the integrity of the two segments' NetWare volumes. This should, in turn, check the integrity of each of the segments. If the left segment has unaccounted space that is at the end of the segment, the segment size is adjusted to end at the last accounted block. Unaccounted-for-space is now between the two segments. If there is free space between the two segments, the method moves (or resizes and moves) the right segment so that it is directly adjacent to the left segment.

Next, step 618 changes the left volume segment object in memory to include the space that is managed by the right volume segment, and to delete the right volume segment object. Note that VREPAIR expects to find file allocation tables at the beginning of each segment, because that is where they are initially placed during NetWare installation; however, the NetWare operating system does not require this condition to operate normally with the file system. The file allocation table is relocated to the default location where NetWare creates it; otherwise some integrity checking utilities such as vrepair.nlm will corrupt the volume by trying to "fix" the file allocation table chain entries. The NetWare operating system, however, works without the file allocation table being relocated to the default location, as it accepts the file allocation table chain for the file allocation table itself as correct.

The integrity of the NetWare volume and all its volume segments is re-verified. In addition, the method verifies the integrity of all volumes that have any volume segment in the partition containing the segments being merged.

Finally, the system 500 writes to the volume definition tables 508 with the new volume segment values, which are based on the volume segment objects in memory. In doing this, all entries in the volume definition table are listed contiguously so that there is a new empty entry after all the used entries in the volume definition table. An alternative embodiment allows users to merge segments which are not on the same partition if there is enough adjacent free space on the partition of the selected volume segment to accommodate the segment being merged there.

With regard to the user interface 520, the user must have selected a current volume segment. In one embodiment, a Merge Volume Segments option will only be enabled if the selected volume segment has a volume segment next to it (on either side) that is from the same volume and the ordinal values of the segments are consecutive. The user selects the Merge Volume Segments option from a Volume Segment Options menu. The user is then presented with a list of one or two volume segments that may be on the left, right, or both sides of the segment and which belong to the same volume, similar to the lists shown in table 1500. It would be helpful to also display the block size and the amount of used blocks in each segment in this list. The user selects one of the volume segments in the list, and a confirmation message is presented allowing the user to accept the proposed merge. After completion of the merge the user is presented with a success message. Errors are handled as discussed in connection with segment moves and resizes.

Testing of the implementation should attempt to merge a left volume segment that has unused space between the last accounted for block in the segment and the segment end. Testing should also attempt to merge with free space between segments that is not on a block boundary for the block size of the volume. In addition, testing should attempt to merge the last two segments of a NetWare partition which has eight volume segments.

Moving Volumes

A logical NetWare or other segmented volume may be moved during step 626, regardless of the location of its volume segments, to a single free space location within a partition large enough to contain the entire volume. This is accomplished as follows.

The user selects a logical volume on the server; free space within a NetWare or other segmented partition is selected as the destination of the volume. If the logical volume contains only a single segment then the same move options are available as if the user had selected Move from a Volume Segment menu. If the volume contains multiple segments the user is then asked whether the system 500 should combine all the segments after the move is complete (step 620).

In one embodiment, once the user selects a volume to move a Volume Limits Object is created and filled in by a NetWare Volume Object or the like, which specifies the size of the entire volume. If the volume contains only a single segment then the move changes to a volume segment move, which is described elsewhere herein. Otherwise, NetWare or other segmented partitions are searched for free space of adequate size to hold the volume. Those that qualify are displayed and the user selects one. The integrity of the volume to be moved and the destination partition containing the free space are both checked. Checking the volume involves checking the integrity of each of the volume's segment objects.

In one embodiment, the volume object guides the movement of each of the volume's segments to the destination free space. The volume object guides creation of each segment's partition object that performs the actual moving of the individual segment. In an implementing program, a class may be included for the volume limits that delimit the size, used space, and free space of the volume. The segments of the volume are moved in ordinal sequence so that when the move is complete the segments are in the correct order to be merged. If the user has chosen to merge all segments, upon successful completion of the move, the volume object calls the destination partition object n–1 times (where n is the number of segments in the volume) to perform step 618 and merge each segment with the segment on its right, until only a single segment remains.

In one embodiment, two main menu options are available: "Select a NetWare Volume", and "Volume Options". When Volume Options is selected, the Move Volume option is available on the menu if there is non-adjacent free space available to where the volume can be moved. When this option is selected the user either is prompted to merge multi-segment volumes or is taken directly to a dialog for selecting the free space as appropriate. Before selecting the free space to where a multi-segment volume will be moved, the user is asked if the volume segments should be combined after the move. This decision may affect which partitions are available, depending upon the number of segments in the combined partition.

If the selected volume has only a single segment then the options available to the user are the same as the "Move a Volume" segment menu option with text strings changed to indicate that a logical volume is being moved. (See the discussion of moving volume segments and its description of the interface 520 for moving volume segments.) If there is no valid free space to receive the volume to be moved, the Move Volume option will not be available on the Volume Options menu. This behavior is similar to what is done for moving/copying a partition during step 628.

Errors are passed up to the user interface 520 through an error return code. Any foreseen errors during the move process would end the move prematurely. The move, however, should be fail-safe since each step can be completed independent of the other steps. Like other manipulations described herein, this manipulation should be designed to be halted between any of the steps without causing damage to the user's data.

Additional Examples

Further comments may be made with regard to specific uses of the invention. For instance, as newer versions of NetWare come out more files have been needed on the DOS partition from which NetWare boots. Sometimes this creates a problem because there is not enough space on the DOS partition. Thus, it would be useful to be able to increase the size of the DOS partition, shrinking the NetWare partition if necessary to obtain space into which the DOS partition will be expanded. Sometimes, the opposite situation exists in that the DOS partition was initially created too big, so space is being wasted in the DOS partition. In such a situation, the user would like to be able to resize the DOS partition smaller and then make the NetWare partition larger. In either situation, the partition manipulation functionality discussed in the incorporated patent documents can be used to resize the DOS partitions, and the invention provides partition manipulation functionality to resize the NetWare partitions.

Another situation that NetWare administrators run into is replacing the original drive which had the DOS partition and the SYS: volume on it, and possibly other volumes as well. Because the servers involved are older the size of drives may be much smaller than what is currently available on the market today. This replacement task involves putting in a new boot drive, copying all information to it, and then booting.

For example, suppose the original drive was a 500 Megabyte drive. To replace it the administrator could put in a 4-8 Gigabyte drive or higher. To use all that space the server could be re-installed to specify the larger drive size, then all the data would need to be restored from tape. This conventional approach is very time consuming. A much quicker way is to use the present invention in a process that copies over the information, resizes the copied partitions as needed, and then extends the NetWare partition to use up the complete new drive. The NetWare system tables 508 are modified to allow NetWare to see the additional drive sectors. This is accomplished by modifying the partition table to show the larger partition and then modifying the redirect structure to let it be available.

One use of step 634 is to remove all data and partitions on a physical drive by moving the data and file allocation table to the other drives defined in the volume. This will allow someone to physically remove a hard drive from the file server. A volume could have segments on the drive being removed as well as other drives, or all the segments could be on the drive being removed. One approach makes room on other drive(s) for the data that is on the drive being removed through resizing and vacating as needed, and moves the volume segments from the drive being removed onto one or more other drives. Another approach adds a new empty drive to the system 500, and then replicates data onto the new drive from the drive being removed. This could be done by a direct copy followed by resizing the target volumes so all of the new drive's storage will be used.

Summary

In summary, the present invention provides a system and method for efficient, correct, and safe manipulation of volume segments and their accompanying volumes and partitions. Units in NetWare and other segmented environments can be resized larger or smaller, their clusters can be resized, and segments and volumes can be copied or moved. A volume may be consolidated by moving its segments to a single drive, or its segments can be distributed among drives, as the user sees fit. Volume segments can be merged to reduce to total number of segments, thereby avoiding (at least for a time) the limits imposed by NetWare or similar file systems. All these manipulations can be done safely even when fault-tolerance data duplication is enabled.

Articles of manufacture within the scope of the present invention include a computer-readable storage medium in combination with the specific physical configuration of a substrate of the computer-readable storage medium. The substrate configuration represents data and instructions which cause the computers to operate in a specific and predefined manner as described herein. Suitable storage devices include floppy disks, hard disks, tape, CD-ROMs, RAM, and other media readable by one or more of the computers. Each such medium tangibly embodies a program, functions, and/or instructions that are executable by the machines to perform segmented partition unit (partition, volume, segment, and/or drive) manipulation steps substantially as described herein.

Although particular methods and signal formats embodying the present invention are expressly illustrated and described herein, it will be appreciated that system and configured storage medium embodiments may be formed according to the signals and methods of the present invention. Unless otherwise expressly indicted, the descriptions herein of methods and signals of the present invention therefore extend to corresponding systems and configured storage media, and the descriptions of systems and configured storage media of the present invention extend likewise to corresponding methods and signals.

As used herein, terms such as "a" and "the" and item designations such as "segment" are inclusive of one or more of the indicated item. In particular, in the claims a reference to an item means at least one such item is required. When exactly one item is intended, this document will state that requirement expressly.

The invention may be embodied in other specific forms without departing from its essential characteristics. The described embodiments are to be considered in all respects only as illustrative and not restrictive. Headings are for convenience only. The scope of the invention is, therefore, indicated by the appended claims rather than by the foregoing description. All changes which come within the meaning and range of equivalency of the claims are to be embraced within their scope.

What is claimed and desired to be secured by patent is:

1. A computer-implemented method for manipulating disk contents, comprising the steps of:
   selecting a unit located on at least one drive, the unit containing a plurality of sectors holding user data and system data in at least one volume segment, the selecting step comprising at least one of the following unit selecting steps:
   selecting a segment;
   selecting a segmented volume;
   selecting a segmented partition;
   selecting a drive containing a segmented partition; and
   manipulating the selected unit(s) in place to produce at least one modified unit, the manipulating step comprising at least one of the following steps:
   changing the number of sectors in at least one selected unit;
   decreasing the cluster size in at least one selected unit;
   merging two selected volume segments to produce a single volume segment;
   consolidating a selected volume by gathering segments onto a single drive through some combination of resizing and/or moving;
   scattering selected segments differently among several drives;
   redistributing data between selected segments by moving data from one segment to another segment;
   moving a selected segment without necessarily moving the surrounding partition and the other partition contents; and
   copying a selected segment without necessarily copying the surrounding partition and the other partition contents.

2. The method of claim 1, further comprising the step of gaining exclusive write access to the selected unit prior to the manipulating step.

3. The method of claim 1, further comprising the step of rebooting after the manipulating step.

4. The method of claim 1, wherein the manipulating step comprises updating a redirection area which identifies bad sectors.

5. The method of claim 1, wherein the manipulating step comprises updating a file system structure which identifies bad sectors.

6. The method of claim 5, wherein the manipulating step comprises updating a bad sector file.

7. The method of claim 1, further comprising the step of verifying the integrity and consistency of file system data.

8. The method of claim 1, wherein the manipulating step comprises preserving at least one copy of all user data on the disk at all times during the manipulating step, thereby reducing the risk of loss of user data if operation of the disk drive is temporarily interrupted during the manipulating step.

9. The method of claim 8, wherein data duplication is being used to duplicate the user data.

10. The method of claim 1, wherein the manipulating step comprises resizing a selected volume segment by changing the number of sectors in the volume segment.

11. The method of claim 1, wherein the manipulating step comprises resizing a selected volume by changing the number of sectors in the volume.

12. The method of claim 1, wherein the manipulating step comprises resizing a selected segmented partition by changing the number of sectors in the partition.

13. The method of claim 1, wherein the manipulating step comprises resizing a selected unit by changing the number of sectors in the presence of data duplication.

14. The method of claim 1, wherein the manipulating step comprises copying a segment.

15. The method of claim 1, wherein the manipulating step comprises copying a volume.

16. The method of claim 1, wherein the manipulating step comprises copying a segmented partition.

17. The method of claim 1, wherein the manipulating step comprises shrinking a segmented partition by resizing the segments within the partition.

18. The method of claim 17, wherein the shrinking step comprises resizing the segments within the partition proportionally smaller.

19. The method of claim 18, wherein the segmented partition has a fixed edge and the segments are shrunk sequentially starting with segment closest to the partition's fixed edge.

20. The method of claim 1, wherein the segmented volume is a NetWare volume.

21. The method of claim 1, wherein the segmented volume is an NTFS volume.

22. The method of claim 1, wherein the manipulating step comprises moving the left edge of a segment.

23. The method of claim 1, wherein the manipulating step comprises replicating data between two disks.

24. A computer system for manipulating units, comprising:
   a computer having a processor, a memory, and a segmented storage medium for holding data according to a partition table and a volume definition table;
   selection means for selecting at least one unit from a collection of units which includes zero or more segments, zero or more volumes, and zero or more segmented partitions, the unit located on the segmented storage medium and containing user data and system data; and
   manipulation means for manipulating the selected unit in place to produce a modified unit from the selected unit without destroying user data and without merely increasing cluster size in the selected unit.

25. The system of claim 24, further comprising a journaling means for recording operations performed by the manipulation means.

26. The system of claim 25, further comprising a playback means for repeating the recorded operations on a second selected set of one or more units to produce a second set of one or more modified units.

27. The system of claim 26, further comprising an undo means for sequentially undoing the recorded operations on the one or more modified units to recover the one or more selected units.

28. The system of claim 24, wherein the user data is divided between disks or partitions according to a volume set definition.

29. The system of claim 24, wherein the user data is subject to a mirror set definition.

30. The system of claim 24, wherein the manipulation means comprises a data replicator which moves the user data to two or more destinations.

31. The system of claim 30, wherein at least one of the destinations comprises a mirrored target partition.

32. A computer storage medium having a configuration that represents data and instructions which will cause at least a portion of a computer system containing at least one NetWare partition to perform method steps for manipulating a unit, the method steps comprising the steps of selecting a unit located on at least one drive, the unit containing a plurality of sectors organized by a NetWare file system into user data and system data in at least one volume segment; and manipulating the selected unit(s) in place to produce at least one modified unit without destroying user data and without merely increasing cluster size in the selected unit.

33. The configured storage medium of claim 32, wherein the manipulating step comprises resizing a selected NetWare volume segment by changing the number of sectors in the volume segment.

34. The configured storage medium of claim 32, wherein the manipulating step comprises resizing a selected NetWare volume by changing the number of sectors in the volume.

35. The configured storage medium of claim 32, wherein the manipulating step comprises resizing a selected NetWare segmented partition by changing the number of sectors in the partition.

36. The configured storage medium of claim 32, wherein the manipulating step comprises resizing NetWare segment clusters by decreasing the number of sectors per cluster.

37. The configured storage medium of claim 32, wherein the manipulating step comprises merging two NetWare volume segments to produce a single NetWare volume segment.

38. The configured storage medium of claim 32, wherein the manipulating step comprises consolidating a NetWare volume by gathering segments onto a single drive through a combination of resizing and/or moving.

39. The configured storage medium of claim 32, wherein the manipulating step comprises redistributing data between NetWare segments by moving data from one NetWare segment to another NetWare segment.

* * * * *